United States Patent [19]

Fuzzell et al.

[11] 3,949,356

[45] Apr. 6, 1976

[54] VEHICLE SYSTEMS MONITOR DISCRIMINATING BETWEEN EMERGENCY CONDITIONS AND DEFERRABLE MAINTENANCE NEEDS

[75] Inventors: Joe E. Fuzzell, Peoria; Allan L. Freedy, Aurora, both of Ill.

[73] Assignee: Caterpillar Tractor Co., Peoria, Ill.

[22] Filed: July 5, 1974

[21] Appl. No.: 485,796

Related U.S. Application Data

[63] Continuation-in-part of Ser. No. 359,853, May 14, 1973.

[52] U.S. Cl. .............................. 340/52 F; 340/414

[51] Int. Cl.[2] .............................. B60Q 1/00

[58] Field of Search ........ 340/52 R, 52 F, 52 C, 60, 340/27, 412, 414; 307/10 R; 180/103 R

[56] References Cited

UNITED STATES PATENTS

| | | | |
|---|---|---|---|
| 3,084,338 | 4/1963 | Mauer et al. | 340/213 |
| 3,509,529 | 4/1970 | Utter | 340/52 R |
| 3,566,401 | 2/1971 | Smith et al. | 340/411 |
| 3,626,367 | 12/1971 | Howard et al. | 340/52 F |
| 3,723,964 | 3/1973 | Lace | 340/52 F |
| 3,798,596 | 3/1974 | Sumiyoshi et al. | 340/52 F |

*Primary Examiner*—John W. Caldwell
*Assistant Examiner*—Joseph E. Nowicki
*Attorney, Agent, or Firm*—Phillips, Moore, Weissenberger, Lempio & Strabala

[57] ABSTRACT

Operating parameters of an engine, such as coolant temperature, oil pressure, air filter flow and the like, are continuously monitored by an electrical circuit responsive to sensor switches. The circuit distinguishes between conditions which require immediate correction, such as low oil pressure for example, and conditions such as reduced porosity of the air filter which need not necessarily be corrected immediately but which should be attended to at the end of the current vehicle operation. The two types of conditions are signalled to the operator by different means and the signalling means for noncritical conditions remains latched on after the engine has been shut down to alert maintenance personnel to the need for corrections. Means are provided for selectively testing the system, for discriminating against nonsignificant, brief, actuations of a sensor switch and for selectively turning off signalling means which have been latched on.

4 Claims, 2 Drawing Figures

HYDRAULIC FLUID LEVEL SENSOR
ASTABLE MULTI-VIBRATOR
WATER TEMPERATURE SENSOR
TIMER
TIMER
TIMER
HYDRAULIC FLUID TEMPERATURE SENSOR
HYDRAULIC FLUID FILTER FLOW SENSOR
OIL PRESSURE SENSOR
GLOW PLUGS
STARTER CIRCUIT
HEAT
START
RUN
STOP
AIR FILTER FLOW SENSOR
VOLTAGE REGULATOR

VEHICLE SYSTEMS MONITOR DISCRIMINATING BETWEEN EMERGENCY CONDITIONS AND DEFERRABLE MAINTENANCE NEEDS

CROSS-REFERENCE TO RELATED APPLICATION

This application is a continuation-in-part of copending application Ser. No. 359,853 of Joe E. Fuzzell and Allan L. Freedy, filed May 14, 1973 and entitled VEHICLE SYSTEMS MONITOR.

BACKGROUND OF THE INVENTION

This invention relates to motorized vehicles and more particularly to instrumentation for detecting and indicating undesirable operating conditions in the engine or other vehicle components In motorized vehicles of virtually all kinds, instruments are employed to alert the operator to any of various undesirable operating conditions such as overheating of the engine, low oil pressure and the like. In some vehicles similar instruments may be provided to indicate operating faults in components distinct from the engine. In earthmoving vehicles for example, where the engine operates a pump to supply pressurized fluid to hydraulic cylinders for manipulating elements of the vehicle, instruments may be present to indicate a low level of hydraulic fluid in the supply reservoir.

Heretofore, most instruments of this kind have simply detected the undesired condition and then signalled the operator by means of dial indicators, indicator lamps or audible means. The efficiency of these systems is greatly dependent upon the operator's careful attention to all of the several indicators and upon his judgment as to which may call for immediate correction and which may be deferred. In the latter case, where it is possible to continue operations in the presence of the fault, it is necessary that the operator remember the problem and arrange for maintenance at the conclusion of vehicle operation. As operators must be concerned with many other aspects of vehicle operation besides instrument observation and since vehicle operation may continue over extended periods of time, errors frequently occur from failure to observe a warning indicator or failure to make the right judgment about the need for corrective actions or from failure to remember a temporarily observed indication of some undesirable operating condition.

SUMMARY OF THE INVENTION

This invention is a warning circuit for motorized vehicles for alerting the operator of undesirable operating conditions and which contains provisions for reducing errors of the kind discussed above. First, the circuit distinguishes between undesirable conditions requiring immediate correction, in which case a first means is employed to signal the operator, as opposed to undesirable conditions which do not require immediate correction in which case a distinguishably different means is utilized to signal the operator. In the case of conditions which do not require immediate correction, the signalling means is latched on so that the condition will not be forgotten and the signalling means remains latched on even after the vehicle is shut down. In situations where the vehicles are routinely inspected by maintenance personnel following each day's operation, this assures that the condition will be noted and corrected. In other situations, it assures that the operator will observe and recall the need for maintenance before resuming operations.

In a preferred form, the invention further includes provisions for disregarding brief detections of undesirable operating conditions which may be momentary and not require corrective action. Means are also provided for testing the circuit itself to assure that it is operating properly and for selectively turning off any latched indicators after corrective action has been taken.

Accordingly, it is an object of this invention to increase the reliability of warning devices on motorized vehicles by alerting the operator of the degree of criticality of an undesirable condition as well as merely indicating existence thereof and further by signalling the existence of such condition after the vehicle has been shut down.

The invention together with further objects and advantages thereof will best be understood by reference to the following description of a preferred embodiment taken in conjunction with the accompanying drawings.

DESCRIPTION OF A PREFERRED EMBODIMENT

Figure 1:
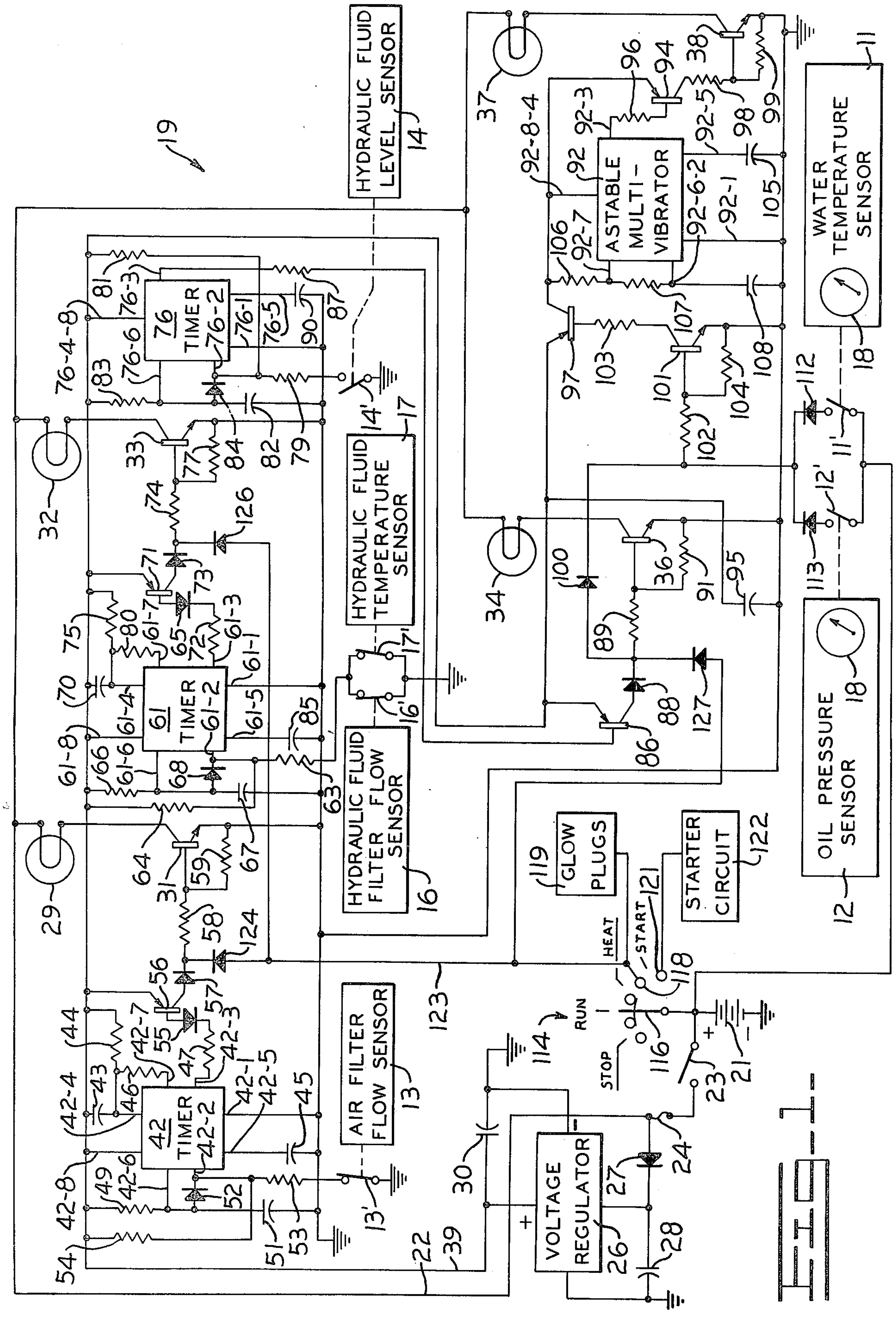
FIG. 1 is an electrical circuit diagram of a vehicle systems monitor embodying the invention.

Motorized vehicles are generally equipped with a variety of sensor devices for monitoring critical operating parameters of the engine or mechanism driven thereby and which open or close an electrical switch when the monitored condition rises or falls to some point outside a normal or acceptable range. For example, the system shown in FIG. 1 is adapted for an earthmoving vehicle that has an engine coolant temperature sensor 11 of the type which closes a normally open switch 11' when engine temperature exceeds a predetermined level indicative of overheating. This system also includes an oil pressure sensor 12 which closes a normally open switch 12' when oil pressure drops below a minimum safe level. The vehicle for which the system is designed further includes an air filter flow sensor 13 which opens a normally closed switch 13' when flow through the engine air filter is reduced to a predetermined level indicative of a loss of porosity and therefore a need to replace the air filter. The particular vehicle also includes hydraulic motors controlling various earthmoving components and operated by pressurized hydraulic fluid from a pump driven by the engine and thus requires a hydraulic fluid reservoir and a hydraulic fluid level sensor 14 therefor. Sensor 14 is of the form which closes a normally open switch 14' when the hydraulic fluid drops to a level indicating a need for additional fluid. Still other sensor devices in this particular system include a hydraulic fluid filter flow sensor 16 which opens a normally closed switch 16' when filter flow is reduced to a level indicative of a need to replace such filter and a hydraulic fluid temperature sensor 17 which opens a normally closed switch 17' when the hydraulic fluid temperature rises to a normal operating level. The several sensor devices 11 through 17, which control the several switches 11' through 17', may all be of known constructions and accordingly will not be herein described in detail. Heretofore, sensors of this nature have most commonly been caused to operate warning lights through the associated switches and in some instances have been provided with dial indicators 18 to indicate the magnitude of the quantity which is being monitored. Such prior systems are effective only to the extent that the operator pays careful attention to the several warning lights, dials, or the like, and insofar as he makes correct judgments as to which conditions need immediate correction and which can safely be deferred.

The present invention provides these conventional functions and, in addition, provides a different form of indication for critical conditions needing immediate correction than is provided for other conditions which can be tolerated for a limited period. Still further, the system retains the warning information for conditions of the latter kind so that it will be noted and corrected at a later time.

For this purpose, the circuit 19 of the present invention may be operated from the vehicle battery 21 which, in this example, has the negative side grounded, and the positive side connected to a B+ conductor 22 through a monitor system on/off switch 23 and a protective fuse 24. B+ conductor 22 supplies power to a series of warning lamps including an air filter warning lamp 29 connected between conductor 22 and ground through the emitter-collector circuit of a control transistor 31, a hydraulic fluid filter warning lamp 32 connected between conductor 22 and ground through the emitter-collector circuit of another control transistor 33, a hydraulic fluid level warning lamp 34 connected between conductor 22 and ground through still another control transistor 36 and an emergency indicator lamp 37 connected between conductor 22 and ground through the emitter-collector circuit of an additional control transistor 38.

Considering now the circuitry through which the several warning lamps are activated in response to the several sensor devices described above, such circuitry in this example operates from a second positive power conductor 39. Conductor 39 is supplied with positive power through a voltage regulator 26 connected between B+ conductor 22 and conductor 39 in series with a diode 27 which protects the regulator against inadvertent reverse connection of battery 21 into the system. To suppress transient voltage spikes, a capacitor 28 is connected between ground and the junction between regulator 26 and diode 27 and another capacitor 30 is connected between conductor 39 and ground. The second positive power conductor 39 is provided to operate solid state components which will be hereinafter described since a lower voltage is required relative to that of B+ conductor 22 and in order to avoid problems from voltage fluctuations which may accompany actuation and deactuation of the several warning lamps.

Opening of the switch 13' controlled by air filter flow sensor 13, indicating at least partial clogging of the air filter, is caused to bias control transistor 31 into conduction and thereby light air filter warning lamp 29. As brief fluctuations in the air flow can occur which are not necessarily indicative of a need for filter replacement, a timer circuit 42 is provided to suppress lighting of the lamp 29 if the opening of switch 13' is not continuous for a predetermined period, at least 15 seconds in this instance. Timer 42 may be a circuit of the known form which has an output terminal 42–3 which switches from a first to a second voltage state when a predetermined voltage is at least momentarily applied to a trigger terminal 42–2 and which thereafter remains in the second state until the power supply terminal 42–8 of the timer is deenergized. This function may be realized with what is essentially a flip-flop circuit responsive to set and reset pulses wherein the reset terminal is held inactive as long as the circuit remains energized by a power supply. Integrated circuits which may be adapted to function in this manner are available to the art. One suitable example is manufactured by Signetics Corp. of Sunnyvale, California and designated as the SE555 CV timer, the internal circuit thereof being shown in block form in FIG. 2. The operation of this circuit is dependant on the nature of the external connections to the terminals 42–1 through 42–8 and accordingly the operation will be hereinafter described following a description of such external connections as employed in the present invention.

Referring again to FIG. 1, to condition the circuit 42 to function in the desired manner, a capacitor 43 and resistor 44 are connected in parallel between timer circuit terminal 42–4 and power conductor 39 and terminal 42–7 is connected to terminal 42–4 through another resistor 46. Terminal 42–5 is connected to ground through a capacitor 45. Terminal 42–6 is connected to the positive power conductor 39 through a resistor 49. A capacitor 51 is connected between power conductor 39 and ground in series with resistor 49, the junction between the capacitor 51 and resistor 49 being connected to trigger terminal 42–2 through a diode 52. Trigger terminal 42–2 is also connected to ground through an additional resistor 53 in series with the previously described switch 13' and is further connected to positive power conductor 39 through another biasing resistor 54. Power terminal 42–8 connects to conductor 39 and terminal 42–1 connects to ground.

Figure 2:
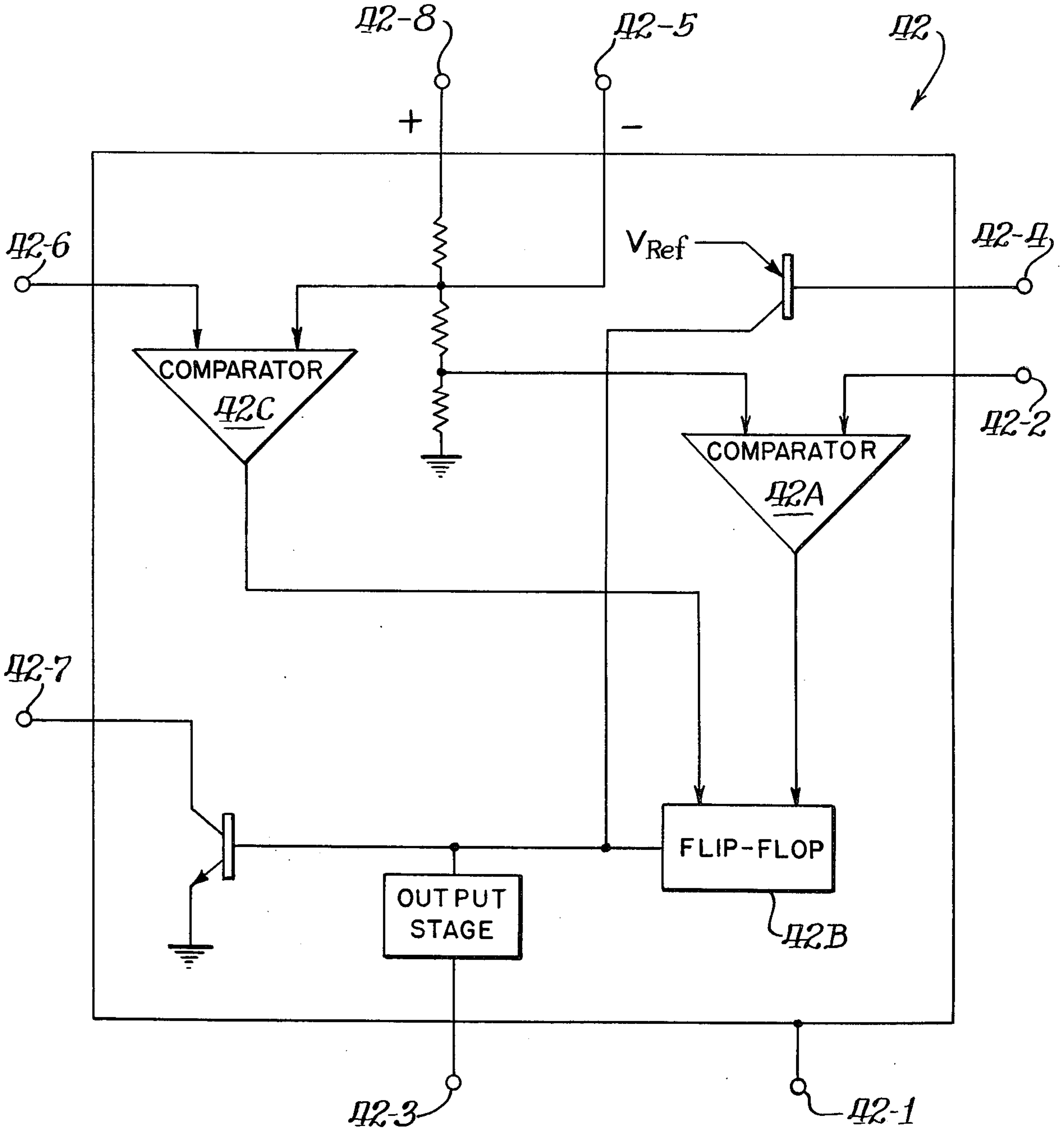
FIG. 2 is a schematic circuit diagram of an integrated circuit used in the system of FIG. 1.

Referring now to FIGS. 1 and 2 in conjunction, as long as switch 13' remains closed, indicating normal air flow through the filter, the trigger terminal 42–2 of timer 42 is connected to ground which is the negative side of the power circuit. This negative voltage at trigger terminal 42–2, detected by comparator 42A by comparison with a reference voltage, sets flip-flop 42B causing output terminal 42–3 to go to a high or energized state. Momentary opening of the switch 13' does not change the high condition of timer output terminal 42–3 since the voltage at trigger terminal 42–2 and terminal 42–6 cannot rise instantaneously owing to the presence of the RC network defined by capacitor 51 and resistor 49. Capacitor 51 requires a finite time, approximately 15 seconds in this instance, to charge to a value sufficient to enable resetting of flip-flop 52B to restore output 52–3 to the low condition. If switch 13' recloses during this interval, the capacitor 51 discharges through diode 52 and circuit 42 is unaffected. However, if switch 13' remains continuously open for the period needed to charge capacitor 51, then flip-flop 42 is reset by the output of comparator 42C. The flip-flop 42B cannot then be restored to the set condition except by de-energizing the timer circuit 42 by manual opening of power switch 23.

The RC circuit formed by capacitor 43 and resistors 44 and 46 delays the negative voltage to terminal 42–4 when the monitor circuit is first energized and thereby prevents premature latching on of the timer circuit at that time.

When output terminal 42–3 of timer circuit 42 goes low, indicating that switch 13' has opened and remained open for a significant period, control transistor 31 is biased into conduction causing warning lamp 29 to be activated. For this purpose, an additional transistor 56 has a base connected to timer output terminal 42–3 through a diode 55 and a resistor 47. The emitter of transistor 56 is connected to positive power conductor 39 while the collector is connected to the base of control transistor 31 through a diode 57 and base current limiter resistor 58. A bias resistor 59 is connected between the base of transistor 31 and the emitter thereof. Accordingly, the low condition at timer circuit output terminal 42–3 turns on transistor 56 which then in turn applies base bias to control transistor 31 which becomes conductive to actuate air filter warning lamp 29. It should be noted that once warning lamp 29 is turned on, it remains activated until switch 23 is manually opened since timer output 42–3 remains low as described above. This serves to remind the vehicle operator or maintenance personnel that the air filter needs attention. Once activated, the lamp 29 is only turned off upon opening of the switch 23 regardless of whether or not the vehicle is shut down.

The circuit for controlling the hydraulic fluid filter warning lamp 32 in response to opening of switch 16′ is basically similar to that of the air filter lamp control circuit which has just been described. Thus, a second timer circuit 61 has a trigger terminal 61–2 connected to ground through switch 16′ and a resistor 63 and connected to positive power conductor 39 through a bias resistor 64. A resistor 66 and capacitor 67 are connected in series between positive power conductor 39 and ground with the junction between the resistor and capacitor being coupled to the terminal 61–2 of timer 61 through a diode 68. The output terminal 61–3 of timer 61 connects to the base of a transistor 71 through a resistor 72 and diode 65. A capacitor 70 and resistor 75 are connected in parallel between power conductor 39 and timer terminal 61–4 and terminal 61–7 is connected to terminal 61–4 through another resistor 80. Timer terminal 61–1 is grounded while a stabilizing capacitor 85 is connected between terminal 61–5 and ground. Terminal 61–6 is connected to the junction between resistor 66 and capacitor 67 while terminal 61–8 is connected to conductor 39.

Transistor 71 has an emitter connected to power conductor 39 and a collector connected to the base of control transistor 33 through a diode 73 and base current limiting resistor 74. A bias resistor 77 is connected between the base and emitter of transistor 33. Accordingly, upon a prolonged opening of switch 16′, the output terminal 61–3 of timer 61 goes negative thereby turning on transistor 71. This biases control transistor 33 into conduction causing hydraulic filter warning lamp 32 to be actuated and to remain actuated until such time as the system control switch 23 is opened. As in the previous instance, lamp 32 is not actuated by a brief opening of switch 16′ of less than 15 seconds duration as that period is required for capacitor 67 to charge to a voltage sufficient to operate the timer 61.

Switch 17′, which opens only after the hydraulic fluid temperature has reached a predetermined normal operating level, is connected in parallel with switch 16′ to prevent hydraulic filter warning lamp 32 from being activated during startup of the vehicle of immediately thereafter as a result of the high viscosity of the cold hydraulic fluid at that time. Until the hydraulic fluid has warmed to a normal level, the high viscosity may produce a pressure differential across the hydraulic fluid filter which causes switch 16′ to open but this condition does not mean that the hydraulic filter fluid is necessarily clogged. After the hydraulic fluid has warmed to normal operating temperatures, switch 17′ opens. Thereafter, any opening of switch 16′ will activate hydraulic filter warning lamp 32 as described above.

The timer 76 of the means for controlling hydraulic fluid level warning lamp 34 in response to switch 14′ is connected to operate in a different mode from that of the previously described timers 42 and 61. Specifically, the output terminal 76–3 does not remain energized once the timer has been triggered but instead is energized only as long as the hydraulic fluid level sensor switch 14′ is closed. For this purpose, the trigger terminal 76–2 of timer 76 is connected to ground through a resistor 79 and switch 14′ and is connected to power conductor 39 through a bias resistor 81. A capacitor 82 and resistor 83 are connected in series between power conductor 39 and ground with the junction between the resistor and capacitor being connected to input 76–2 of timer 76 through a diode 84. In this case, the values of capacitor 82 and resistor 83 are selected so that the capacitor charges to a voltage sufficient to trigger timer 76 2 seconds after switch 14′ has closed and remained closed. Unlike the interconnections of previously described timers, terminals 76–4 and 76–8 are connected directly to power conductor 39, terminal 76–5 is connected to ground through a capacitor 90 and terminal 76–7 is unutilized.

The output terminal 76–3 of timer 76 is connected to the base of a transistor 86 through a current limiting resistor 87 to turn on the transistor when the timer output goes low or negative. Transistor 86 has an emitter connected to positive power conductor 39 and a collector connected to the base of control transistor 36 through a diode 88 and resistor 89, a bias resistor 91 being connected between the emitter and base of control transistor 36. Thus, control transistor 36 is turned on th actuate hydraulic fluid level warning 34 if sensor switch 14′ has remained closed for 2 seconds. Unlike the previously described indicator lamps, lamp 34 is not latched on once it has been actuated. The reason for this is that a low hydraulic fluid level is a critical condition the correction of which should not be deferred. To alert the operator to the fact that a critical warning is being given, the emergency lamp 37 is activated simultaneously with lamp 34 and flashes to designate the emergency condition.

To provide for flashing of lamp 37, an astable multivibrator 92 is employed, which if desired may be an integrated circuit of the same type as timers 42, 61 and 76 but having different external connections as will hereinafter be described. The output terminal 92–3 of multivibrator 92 is coupled to the base of a transistor 94 through a current limiting resistor 96. The emitter of transistor 94 is connected to positive power conductor 39 through the emitter collector of circuit of an additional transistor 97 and the collector of transistor 94 is connected to the base of flashing lamp control transistor 38 through a resistor 98 and is connected to ground through resistor 98 and still another resistor 99. Accordingly, provided transistor 97 is conductive and the multivibrator 92 is energized as will be described, the multivibrator cyclically turns transistors 94 and 38 on and off to cyclically energize lamp 37.

Transistor 97 is turned on to energize the multivibrator 92 concurrently with actuation of hydraulic fluid level lamp 34 inasmuch as the base of another transistor 101 is connected to the junction of the previously described diode 88 and resistor 89 through a resistor 102 and diode 100. The collector of transistor 101 connects to the base of transistor 97 through a resistor 103 and the emitter of transistor 101 is connected to ground. A bias resistor 104 is connected between the emitter and base of transistor 101.

Accordingly, when transistor 86 is turned on to energize the hydraulic fluid level warning lamp 34 as previously described, this also turns on transistor 101 which then turns on transistor 97. The collector of transistor 97 is connected to ground through a resistor 106, resistor 107, and capacitor 108 to form an RC network which determines the oscillator frequency of multivibrator 92. To provide for the astable multivibrator action both terminals 92–2 and 92–6 of multivibrator 92 are connected to the junction between resistor 107 and capacitor 108, terminal 92–7 is connected to the junction between resisitors 106 and 107 and terminals 92–4 and 92–8 are each connected to the collector of transistor 97. Terminal 92–5 is coupled to ground through a stabilizing capacitor 105.

To stabilize operation of the several timer circuits, a high frequency transient filtering capacitor 95 is connected between power conductor 39 and ground.

The two additional sensor switches 11′ and 12′ which respectively indicate engine overheating and low oil pressure also activate the flashing lamp 37 as these are both emergency conditions requiring immediate correction. Switch 11′ is connected between B+ conductor 22 and the junction point between diode 100 and resistor 102 through an additional diode 112. Switch 12′ is similarly connected between B+ conductor 22 and the same junction point through another diode 113. Accordingly, closing of either or both of switches 11′ and 12′ applies positive base bias to transistor 101 which then in turn biases transistor 97 into conduction to activate the multivibrator 92 and flashing lamp 37 in the manner previously described.

It may be observed that flashing of lamp 37 occurs in the event of any of three different emergency conditions. If the condition is a low level of hydraulic fluid this is immediately apparent in that lamp 34 is also activated. If lamp 34 is not activated, the operator may determine whether the lamp 37 is flashing because of low oil pressure or because of overheating by reference to dial indicators 18.

As the system is designed for indicating and warning of undesirable vehicle operating conditions, reliability can be greatly enhanced if means are provided for testing the several warning lamps and associated components to assure that all systems are in operating order. For this purpose, means are provided for selectively energizing all warning lamp control transistors. The system of this particular example is designed which use on a vehicle having a diesel engine whhich includes an engine control switch 114 and this switch is utilized for the purpose of testing the monitoring system. Typically such a diesel engine control switch 114 may have a movable contact 116 coupled to the positive side of battery 21 and which is selectively connectable with a plurality of terminals including a Stop terminal for actuating the engine shutdown means, a Run terminal which is energized once the engine is started and operating, a Preheat terminal 118 which is energized prior to starting the engine and which connects with glow plugs 119 that warm the engine cylinders prior to starting and a Start terminal 121 for energizing the starter circuit 122. Suitable detailed construction for the engine control switch 114 and the glow pulg and starter circuits 119 and 122, respectively, are well known to the art. This example of the invention is arranged to test the components of the monitoring system at the same time that the glow plugs 119 are being energized, during the engine start cycle, by energization of terminal 118 of the engine control switch 114. Specifically, a test signal conductor 123 is connected to preheat terminal 118 and is branched to connect with the junction between diode 57 and resistor 58 through an additional diode 124, to connect with the junction between diode 73 and resistor 74 through another diode 126 and to connect with the junction between diode 88 and resistor 89 through still another diode 127. Thus, when the engine control switch is operated to the Preheat position, bias voltage is simultaneously applied to the bases of each of the warning lamp control transistors 31, 33 and 36 and also to transistor 101 to actuate multivibrator 92 and flashing lamp 37. Accordingly, at this time, the operator may ascertain that all lamps are operable. When the engine control switch 114 is subsequently moved to the Start position, preheat terminal 118 remains energized due to bridging action of movable contact 116 and the lamp test is continued during the engine cranking period. The test biasing is removed from the several control transistors and remains removed when the control switch is later returned to the Run position or the Stop position.

While the invention has been described with respect to a specific preferred embodiment, it will be apparent that many modifications are possible and it is not intended to limit the invention except as defined in the following claims.

What is claimed is:

1. A monitor system for signalling the existence of any of a plurality of undesirable operating conditions in a motorized vehicle which has a battery and a first electrical switch coupled thereto for starting and shutting down said motorized vehicle comprising:

at least one first sensor device for actuating a first sensor switch in response to an undesirable operating condition of a non-emergency kind which does not require immediate correction, at least one second sensor device for actuating a second sensor switch in response to a different undesirable operating condition which is of an emergency kind requiring substantially immediate correction, a first indicator device having means for signalling an operator and a second indicator device having distinguishably different means for signalling an operator, first circuit means connected between said first sensor switch and said first indicator device for initiating operation of said first indicator device in response to actuation of said first sensor switch, latching means coupled to said first indicator device for continuing said operation of said first indicator device following said initiation of operation thereof and which continues said operation of said first indicator device after said motorized vehicle is shut down, second circuit means connected between said second sensor switch and said second indicator device for operating said second indicator device in response to actuation of said sensor switich and having means for terminating said operation of said second indicator device in response to deactuation of said second sensor switch, and a manually operable monitor system control switch connected between said battery and said first and second circuit means for energizing said first and second circuit means to activate said monitor system and for selectively de-energizing said first and second circuit means to stop operation of said first indicator device after said first indicator device has been latched in the operated condition and said vehicle has been shut down said control switch being connected between said battery and said first circuit means independently of said first switch.

2. The combination defined in claim 1 wherein said first indicator device continuously signals while being operated further comprising means coupled to said second indicator device for causing said second indicator device to intermittently signal while being operated.

3. The combination defined in claim 1 wherein said undesirable condition to which said first sensor device responds involves reduction of a fluid flow, further comprising means for sensing the temperature of said fluid and means coupled to said temperature sensing means and to said first circuit means for preventing operation of said first indicator device in response to actuation of said first sensor switch while the temperature of said fluid is below a predetermined fixed level.

4. The combination defined in claim 1 further comprising an additional second sensor device for actuating an additional second sensor switch in response to a second undesirable condition of the emergency kind requiring substantially immediate correction, third circuit means connected between said additional second sensor switch and said second indicator device for operating said second indicator device in response to actuation of said additional second sensor switch, and individual indicator means coupled to said second sensor device and said additional second sensor device for determining the particular undesirable condition in existence when said second indicator device is operated.

* * * * *